Patented Feb. 21, 1933

1,898,399

UNITED STATES PATENT OFFICE

ROBERT EMANUEL SCHMIDT, OF ELBERFELD, AND ROBERT BERLINER, OF VOHWINKEL NEAR COLOGNE, GERMANY, ASSIGNORS TO GENERAL ANILINE WORKS, INC., OF NEW YORK, N. Y., A CORPORATION OF DELAWARE

NEW CONDENSATION PRODUCTS OF FORMALDEHYDE AND 1-AMINO-ANTHRAQUINONE COMPOUNDS BEING SUBSTITUTED IN THE 4-POSITION

No Drawing. Application filed November 28, 1925, Serial No. 72,031, and in Germany December 9, 1924.

The present invention relates to new condensation products of formaldehyde and 1-amino-anthraquinone compounds being substituted in 4-position, and to a process of preparing the same.

By reacting with formaldehyde upon amino-anthraquinones in indifferent solvents, particularly ethyl-alcohol, as described in German Patent 123,745 products are obtained which have no dyeing properties and which are furthermore easily split up into their components, as for instance by the action of dilute mineral acids.

It is also well known as described in German Patent 156,056 that by reacting in mineral acid solutions of about 60% strength with a large excess of formaldehyde upon amino-anthraquinones, methylamino-anthraquinones are formed.

We have found that 1-amino-anthraquinone compounds being substituted in the 4-position by a monovalent substituent, such as, for instance, an amino group or an hydroxyl group, form new condensation products when caused to react with formaldehyde in a sulfuric acid solution of about 70–85% strength at a temperature of about 30–100° C. In our new process one may use, instead of the sulfuric acid solution of about 70–85% strength, mixtures of glacial acetic acid with concentrated sulfuric acid, phosphoric acid, boric acid, phosphorous oxychloride, aluminum chloride and others. The addition of boric acid to the sulfuric acid usually greatly facilitates the reaction when applied to such alpha-amino-anthraquinone compounds which can form boric acid-esters.

Instead of formaldehyde one may use polymerization products of formaldehyde such as trihydroxymethylene or para formaldehyde etc.—or compounds which are easily decomposed with the formation of formaldehyde such as formaldehyde-bisulfit, methylal, methylene diacetate and for convenience we will call such products generally formaldehyde compounds.

It is well known that the alpha-aminoanthraquinone compounds yield deeply colored solutions when formaldehyde is added to their solution in concentrated sulfuric acid and are split up into their components when the solution is poured into water.

According to the concentration of the acid used and the temperature employed such labile addition products of formaldehyde may be primarily formed in our new process. However, they are readily transformed into our new condensation products by raising, for instance, the temperature of the reaction mixture, which reaction is usually accompanied by a characteristic change of color and slight increase of temperature. This transformation occurs with various speeds dependent upon the temperature and the individual amino-anthraquinone used. The formaldehyde addition products of 1-4-aminohydroxyanthraquinones obtained at ordinary temperature in 70% sulfuric acid are completely transformed into the condensation products gradually and slowly whereas at 70–80° C. this transformation occurs in a very short time. 1-4-diaminoanthraquinone dissolved in sulfuric acid gives by addition of formaldehyde a violet-blue solution of the addition compound, which at ordinary temperature in a few seconds become green, indicating formation of the condensation product.

When causing one mol. of formaldehyde to react upon one mol. of the anthraquinone compound, condensation products are obtained in which the formaldehyde radicle is linked in a stable form to the anthraquinone compound. We shall name these compounds hereafter Type 1 compounds.

When causing more than one mol. of formaldehyde,—for instance, two mols. of formaldehyde,—to react upon one mol. of the anthraquinone compound, products are obtained which contain one mol. of the formaldehyde in a stable linkage and the excess of the formaldehyde employed in a less firm linkage. We shall name these compounds hereafter Type 2 compounds. The constitution of the end products is not perfectly known. However we have found that the Type 2 compounds, when subjected to a gentle oxidation process, are transformed into well characterized intermediate oxidation products (Type 3 compounds) which, when treated subsequently with cold water, lose the less firmly bound formaldehyde and are transformed into the Type 1 compounds.

This oxidation can be effected by various oxidation agents; i. e. pyrolusite in concentrated sulfuric acid. Concentrated sulfuric acid alone acts as an oxidizing agent when compounds of the second type are dissolved in it; at ordinary temperatures the oxidation proceeds slowly but is considerably speeded up by heating on a boiling water bath. The elimination of the additional formaldehyde from these primary oxidation products can be effected without their isolation; oxidation and elimination are so condensed into one single operation. The following table shows the different steps of our process and the different products obtained when using as starting material 1.4-amino-hydroxy-anthraquinone.

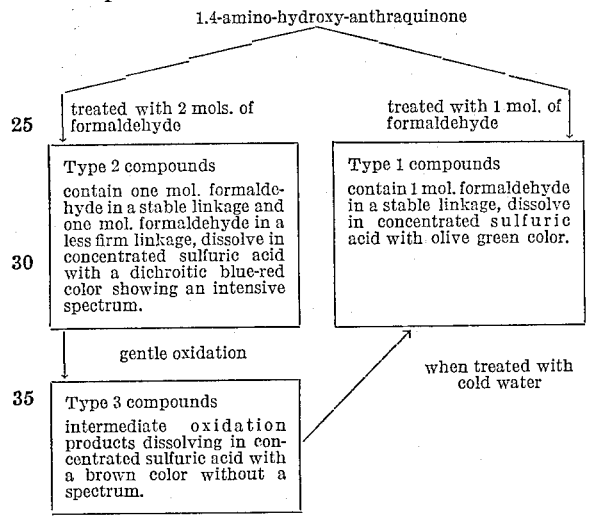

We wish it to be understood that, by subjecting the compounds of Type 1, Type 2 or Type 3 to a strong oxidation, new oxidation products are obtained which are described and claimed in our co-pending applicaton Serial No. 72,030, filed on November 28, 1925.

The compounds of Type 1 as well as of Type 2 and mixtures of both are equally well suited for dyeing vegetable fibres by the vatting method or for the production of other vat dyestuffs. It is therefore quite useless to separate the products as obtained, on the contrary the possibility of obtaining mixtures and using same directly increases the range of applications and cheapens the production of the novel condensation products.

Our new condensation products are usually dark violet to green powders, insoluble in water, soluble with intense colorations in concentrated sulfuric acid which colors undergo characteristic changes by heating. They are reduced by alkaline hydrosulfite solutions to form generally violet vats from which animal fibres are dyed violet shades, which by oxidation change to bluish-grey to black shades, exceedingly fast to light and washing.

The following examples will further illustrate my invention, the parts being by weight. It is however understood that our invention is not limited to the particular materials cited nor to the specific conditions given in these examples.

*Example I.*—20 parts finely ground 1-4-amino-hydroxy-anthraquinone are introduced into 600 parts 70% sulfuric acid and heated to 90° C. By cooling to 25° the sulfate separates and the mass forms a thick paste to which 10 parts paraformaldehyde are added. The mass is gently stirred at 25° and gradually the sulfate dissolves forming a bluish-violet solution of the labile addition product. If this is kept for 12–36 hours at room-temperature the color of the solution turns to olive green and most of the condensation product of Type 2 formed separates. It is isolated in the usual way by filtering, washing and drying. The transformation of the loosely bound formaldehyde addition compound into the condensation product occurs rapidly if the reaction mass is heated to 70–75°, the color of the solution changes suddenly from bluish-violet to green with separation of the condensation product of Type 2.

The product as obtained is a dark violet crystalline powder soluble in concentrated sulfuric acid with a dichroic color, violet in thick layers, blue in thin layers. The solution shows an intense absorption spectrum. Poured into water the condensation product separates as a violet precipitate. The sulfuric acid solution changes its color gradually to brown at ordinary temperature, more rapidly so by heating on the water bath, the absorption spectrum at the same time disappears, and by pouring into water a greenish blue precipitate is now obtained. Heating the brown solution to 180–190° its color turns gradually to a bright reddish-violet; by addition of boric acid the solution becomes a bright bluish green. It dyes cotton from an alkaline hydrosulfite vat greenish shades.

*Example II.*—24 parts 1-4-amino-hydroxy-anthraquinone are dissolved in 500 parts 96% sulfuric acid, 185 parts of water are then added, keeping the temperature at 80–90°; cooling then to 40° the sulfate separates. 4 parts paraformaldehyde are then added and the mixture heated on the water bath, while stirring, until the bluish-violet color of the solution has turned green, the crystalline condensation product Type 1 separates; it is filtered off cold and isolated in the usual way. Unreacted 1-4-amino-hydroxyanthraquinone particles can be eliminated by an extraction with cold alcohol. This condensation product is a dark greenish-blue crystalline powder, soluble in concentrated sulfuric acid with an olive green color, which does not change by standing at ordinary temperature; heated on the water bath the color changes only after some time, becoming violet. At slightly higher temperature, say 130°, the change is quite rapid, a bright reddish violet solution is obtained and it contains then the same compound as obtained by heating to 180–190° the sulfuric acid solution of the condensation product of Type 2 obtained from 1-4-amino-hydroxy-anthraquinone as described in Example 1.

*Example III.*—6 parts of the condensation product of Type 2 as obtained in Example 1 are dissolved in 150 parts 96% sulfuric acid and the solution heated to 80–85°. The bluish-red dichroic color of the solution turns quickly to a yellowish-brown with simultaneous evolution of sulfur dioxid and disappearance of the spectrum; when this latter point is reached the solution is cooled to about 50° and 26 parts of water are poured slowly in, taking care to keep the temperature below 100°. The intermediate oxidation product of Type 3 separates on cooling in form of beautiful homogeneous crystals. These are filtered off and washed with 65% sulfuric acid. They are soluble in concentrated sulfuric acid with a yellowish-brown color. The chemical constitution of this intermediate oxidation product is not well known, it contains loosely bound formaldehyde. If the crystals are now treated on the filter with cold water they lose their loose formaldehyde which can be found in the wash-water. The crystals do not change their form, but they dissolve now in concentrated sulfuric acid with a green color and the product is identical with the condensation product, Type 1, as obtained in Example II. As a matter of fact it is obtained in this manner in an exceedingly pure state.

*Example IV.*—20 parts 1-4-amino-hydroxy-anthraquinone, 4 parts of paraformaldehyde and 1500 parts glacial acetic acid are heated to 90°. To the bluish-violet solution containing the labile amino-anthraquinone-formaldehyde compound, as obtained, there are added 200 parts 96% sulfuric acid. The color of the solution quickly changes to green. The reaction mass is allowed to cool; it is then filtered off, washed with glacial acetic acid, followed by alcohol. A very pure condensation product, Type 2 identical with that of Example I is obtained. If in the above procedure only 3 parts paraformaldehyde are used a condensation product of Type 1 is obtained.

*Example V.*—10 parts of the condensation product, Type 2, as obtained for instance in Example IV are dissolved in 400 parts 96% sulfuric acid, cooled to 6–10° C. and a 10% suspension of pyrolusite in concentrated sulfuric acid added while stirring, until the color of the solution has become brown and the original absorption spectrum disappeared. The reaction mass is poured into water, the greenish-blue precipitate obtained filtered off, washed to neutrality, dried. It is the condensation product Type 1, identical with the products of Examples II and III. The intermediate oxidation product as contained in the brown sulfuric melt has lost its loosely bound formaldehyde by pouring the melt in water.

*Example VI.*—20 parts-1-4-amino-hydroxy-anthraquinone, 10 parts boric acid, 600 parts 70% sulfuric acid are heated to 80–90°, cooled to 22° and 5 parts paraformaldehyde added. The reaction mass turns immediately violet and the precipitated 1-4-amino-hydroxy-anthraquinone sulfate dissolves. After a short while the color changes to green and the mass nearly solidifies due to separation of the condensation product, which represents a mixture of Type 1 and Type 2 compounds.

*Example VII.*—10 parts 1-4-amino-hydroxy-anthraquinone are dissolved in 250 parts 96% sulfuric acid, 5 parts boric acid added and heated to 80–90° so as to effect formation of the boric acid ester. After cooling to 22° 2½ parts paraformaldehyde are added. 80 parts water are added while stirring to the bluish-violet solution obtained, keeping the temperature by cooling below 35°. The transformation starts shown by the change of color to green, even during the addition of water and is complete after all is added, part of the reaction product crystallizing out. The reaction mass is poured into water, filtered off and washed to neutrality. The condensation product so obtained is a mixture of compounds of Type 1 and Type 2. This product forms, when reduced hot with hydrosulfite and caustic soda a violetish-red vat from which cotton is dyed violet shades, which by oxidation become a bluish-grey of excellent fastness to light and washing.

*Example VIII.*—20 parts 1-4-amino-hydroxy-anthraquinone are dissolved at 90° in 1500 parts glacial acetic acid, then 10 parts paraformaldehyde added. Keeping the temperature at 80–90° 1200 parts syrup-phosphoric acid are added and the heating continued until the change of color from violet to greenish-olive has occurred. The condensation product separates and is isolated in the usual way. It represents a compound of Type 2.

*Example IX.*—1 part finely ground 1-4-amino-hydroxy-anthraquinone is suspended in 10 parts 40% aqueous formaldehyde solution and heated for some time to 50–60°. Part of the amino-hydroxy-anthraquinone dissolves with a violet color. The mass is then cooled to room temperature and gradually phosphorous oxychloride added, until the color of the solution which became red at first, has turned to a pure blue. Occasionally the reaction starts spontaneously at this point, otherwise the reaction mass is heated to 70–80° until the color has changed to olive green. The reaction product is then poured into water, the condensation product which separates is filtered off, washed to neutrality, dried at low temperature. The condensation product represents a compound of Type 2.

*Example X.*—20 parts 1-4-diamino-anthraquinone are dissolved in 600 parts 90% sulfuric acid and 3 parts trihydroxymethylene added. 200 parts water are added to the above blue solution, keeping the temperature below 30°. The color of the solution changes suddenly to green, even before all the water has been added. The reaction mass is left standing for some time; the condensation product separates as a dark greenish crystalline powder, it is filtered off, washed, freed from unreacted 1-4-diamino-anthraquinone by extraction with cold alcohol and dried. The condensation product represents a compound of Type 1.

*Example XI.*—If 10 parts of trihydroxymethylene are used in the above Example No. 10, but the reaction otherwise carried out in the same manner the condensation product of Type 2 is obtained. It is a brownish powder, soluble in concentrated sulfuric acid with a yellowish-brown color which changes rapidly into a dichroic reddish-blue, violet in thick layers and blue in thin layers. This solution shows an intense absorption spectrum, and when poured into water yields a violet precipitate. Heated on the water bath, this sulfuric acid solution turns olive-brown and the spectrum disappears. A greenish-blue precipitate is now obtained when the solution is poured into water. Heated to 230° C., the sulfuric acid solution turns green. This condensation product (Type 2) dyes cotton from a hydrosulfite vat and after oxidation very fast grayish shades.

*Example XII.*—20 parts 1-methoxy-4-amino-anthraquinone are dissolved hot in 500 parts 96% sulfuric acid cooled at 30° and 185 parts of water run in, keeping the temperature below 100°. On cooling to 40° the 1-4-methoxy-amino-anthraquinone sulfate crystallizes out. 10 parts para formaldehyde are added to the paste and the mass heated to 80–85° until the blue color has changed to green. The condensation product thus obtained separates as a dark greenish powder. It is isolated in the usual way. It dissolves in concentrated sulfuric acid with a blue color which changes to violet on heating.

*Example XIII.*—20 parts 1-methoxy-4-amino-anthraquinone are dissolved hot in 200 parts glacial acetic and at 60° 3 parts para formaldehyde are added. The temperature of the reaction mass is slowly increased. The mass becomes nearly solid at 65–70° through separation of the red colored labile 1-methoxy-amino-anthraquinone-formaldehyde addition product. 100 parts sulfuric acid are then added, the color changes instantaneously to blue and then to olive and the precipitate dissolves. The reaction proceeds further and the condensation product separates. It is isolated in the usual way. It is a dark blue crystalline powder, soluble in concentrated sulfuric acid with a dull reddish color, turning dark green by heating on the water bath and light red by heating to higher temperatures. It forms a violet vat, from which cotton is dyed violet shades, which become bluish-grey to black on oxidation.

We claim:

1. In processes of preparing new condensation products of formaldehyde and 1-amino-anthraquinone compounds substituted in 4-position by an amino- or hydroxy group, the step comprising reacting with formaldehyde upon a 1-amino-anthraquinone compound substituted in 4-position by an amino- or hydroxy group in a sulfuric acid solution of 70–85% strength.

2. In processes of preparing new condensation products of formaldehyde and 1-amino-anthraquinone compounds substituted in 4-position by an amino- or hydroxy group, the step comprising reacting with formaldehyde upon a 1-amino-anthraquinone compound substituted in 4-position by an amino- or hydroxy group in a sulfuric acid solution of 70–85% strength at a temperature between about 30° and 100° C.

3. In processes of preparing new condensation products of formaldehyde and 1-amino-anthraquinone compounds substituted in 4-position by an amino- or hydroxy group, the step comprising reacting with 1 molecule of formaldehyde upon one molecule of a 1-amino-anthraquinone compound substituted in 4-position by an amino- or hydroxy group in a sulfuric acid solution of 70–85% strength.

4. In processes of preparing new condensation products of formaldehyde and 1-amino-anthraquinone compounds substituted in 4-position by an amino- or hydroxy group, the step comprising reacting with 1 molecule of formaldehyde upon one molecule of a 1-amino-anthraquinone compound substituted in 4-position by an amino- or hydroxy group in a sulfuric acid solution of 70–85% strength at a temperature between about 30° and 100° C.

5. In processes of preparing new condensation products of formaldehyde and 1-4-amino-hydroxy-anthraquinone, the step comprising reacting with formaldehyde upon 1-4-amino-hydroxy-anthraquinone in a sulfuric acid solution of 70–85% strength.

6. In processes of preparing new condensation products of formaldehyde and 1-4-amino-hydroxy-anthraquinone, the step comprising reacting with formaldehyde upon 1-4-amino-hydroxy-anthraquinone in a sulfuric acid solution of 70–85% strength, at a temperature between about 30° and 100° C.

7. In processes of preparing new condensation products of formaldehyde and 1-4-amino-hydroxy-anthraquinone, the step comprising reacting with one molecule of formaldehyde upon one molecule of 1-4-amino-hydroxy-anthraquinone in a sulfuric acid solution of 70–85% strength.

8. In processes of preparing new condensation products of formaldehyde and 1-4-amino-hydroxy-anthraquinone, the step comprising reacting with one molecule of formaldehyde upon one molecule of 1-4-amino-hydroxy-anthraquinone in a sulfuric acid solution of 70% strength and at a temperature of about 80°–100° C.

9. As new products of one molecule, condensation products of formaldehyde and one molecule of a 1-amino-anthraquinone compound substituted in 4-position by an amino- or hydroxy group, in which the radicle of one molecule of formaldehyde is linked in a stable linkage to one molecule of the 1-amino-anthraquinone compound, being in a dry state green to dark-violet crystalline powders, insoluble in water, soluble in concentrated sulfuric acid with intense coloration, dyeing animal fibers from violet vats violet shades, which by oxidation becomes bluish-green to black and are exceedingly fast to light and washing.

10. As a new product, the condensation product of one molecule of formaldehyde and one molecule of 1-4-amino-hydroxy-anthraquinone being in a dry state a dark greenish-blue crystalline powder, soluble in concentrated sulfuric acid with an olive-green color which when the solution is heated to a temperature of about 130° C., changes into a bright reddish-violet, dyeing animal fibers from a violet vat violet shade, which by oxidation change into blue-gray to black shades being exceedingly fast to light and washing.

11. As new products, condensation products of one to two molecules of formaldehyde and one molecule of a 1-amino-anthraquinone compound substituted in 4-position by an amino- or hydroxy group, in which the radicle of one molecule of formaldehyde is linked in a stable linkage to one molecule of the 1-amino-anthraquinone compound, being in a dry state brownish to green to dark-violet crystalline powders, insoluble in water, soluble in concentrated sulfuric acid with intense coloration and dyeing animal fibers from alkaline hydrosulfite vats violet to grayish shades.

12. As new products, condensation products of one to two molecules of formaldehyde and one molecule of 1.4-amino-hydroxyanthraquinone being in a dry state dark-greenish to blue to violet crystalline powders, insoluble in water, soluble in concentrated sulfuric acid and dyeing animal fibers from an alkaline hydrosulfite vat violet to grayish shades.

13. In processes of preparing new condensation products of formaldehyde and 1-amino-anthraquinone compounds substituted in 4-position by an amino- or hydroxy group, the step comprising reacting with two molecules of formaldehyde upon one molecule of a 1-amino-anthraquinone compound substituted in 4-position by an amino- or hydroxy group in a sulfuric acid solution of 70–85% strength.

14. In processes of preparing new condensation products of formaldehyde and 1-amino-anthraquinone compounds substituted in 4-position by an amino- or hydroxy group, the step comprising reacting with two molecules of formaldehyde upon one molecule of a 1-amino-anthraquinone compound substituted in 4-position by an amino- or hydroxy group in a sulfuric acid solution of 70–85% strength at a temperature between about 30° and 100° C.

15. In processes of preparing new condensation products of formaldehyde and 1-4-amino-hydroxy-anthraquinone, the step comprising reacting with two molecules of formaldehyde upon one molecule of 1.4-amino-hydroxy-anthraquinone in a sulfuric acid solution of 70–85% strength.

16. In a process of preparing new condensation products of formaldehyde and 1-4-amino-hydroxy-anthraquinone, the step comprising reacting with two molecules of formaldehyde upon one molecule of 1.4-amino-hydroxy-anthraquinone in a sulfuric acid solution of about 70% strength and at a temperature of 70–100° C.

17. As new products condensation products of two molecules of formaldehyde and one molecule of a 1-amino-anthraquinone compound substituted in 4-position by an amino- or hydroxy group in which the radicle of one molecule of formaldehyde is linked in a stable linkage and the radicle of a second molecule of formaldehyde is linked in a less firm linkage to one molecule of the 1-amino-anthraquinone compound, being in a dry state brownish to dark-violet crystalline powders, insoluble in water, soluble in concentrated sulfuric acid with an intensive dichroic coloration, dyeing animal fibers from an alkaline hydrosulfite vat grayish shades.

18. As a new product the condensation product of two molecules of formaldehyde and one molecule of 1-amino-4-hydroxy-anthraquinone, being in a dry state a dark-violet crystalline powder, soluble in concentrated sulfuric acid with a dichroic color, violet in thick layers, blue in thin layers, with an intense absorption spectrum, the solution color changing when the solution is heated to 180–190° C., into a bright reddish-violet, dyeing animal fibers from an alkaline hydrosulfite vat grayish shades.

In testimony whereof we have hereunto set our hands.

ROBERT EMANUEL SCHMIDT.
ROBERT BERLINER.